Jan. 27, 1959  L. F. STRINGER  2,871,437
CONTROL APPARATUS
Filed May 26, 1954  2 Sheets-Sheet 1

WITNESSES
INVENTOR
Loren F. Springer
BY
ATTORNEY

United States Patent Office 2,871,437
Patented Jan. 27, 1959

2,871,437

CONTROL APPARATUS

Loren F. Stringer, Pittsburgh, Pa., assignor to Westinghouse Electric Corporation, East Pittsburgh, Pa., a corporation of Pennsylvania Application May 26, 1954, Serial No. 432,403

8 Claims. (Cl. 321—18)

This invention relates to electrical control apparatus and more particularly to regulating apparatus for maintaining a predetermined quantity substantially constant.

In many applications it is necessary to prevent the output voltage of a regulator system from becoming excessive either on first energizing the regulator system or on increasing the output voltage of the regulator system to a higher predetermined value which is to be maintained substantially constant. For instance, in steel mill applications in which the voltage across a direct-current bus is to be maintained substantially constant, and in which the roll motors receive energy from the direct-current bus, it is necessary to prevent the voltage across the direct-current bus from becoming excessive. If some such means is not provided, the load circuit interrupters interconnected between the direct-current bus and the roll motors will be actuated to the circuit interrupting position once the voltage across the direct-current bus becomes excessive, thereby deenergizing the roll motors and thus effecting a stoppage of the rolls.

An object of this invention is to provide for continuously regulating the output voltage of an electrical system as the output voltage is increased from one predetermined value to another, to thereby prevent the output voltage of the electrical system from becoming excessive.

Another object of this invention is to provide for preventing a regulator system from driving the output voltage of an electrical system to an excessive value on first energizing the apparatus.

A further object of this invention is to provide for uniformity of response for a regulator system even though the regulator system is capable of regulating for different predetermined output voltages.

Figure 1A:
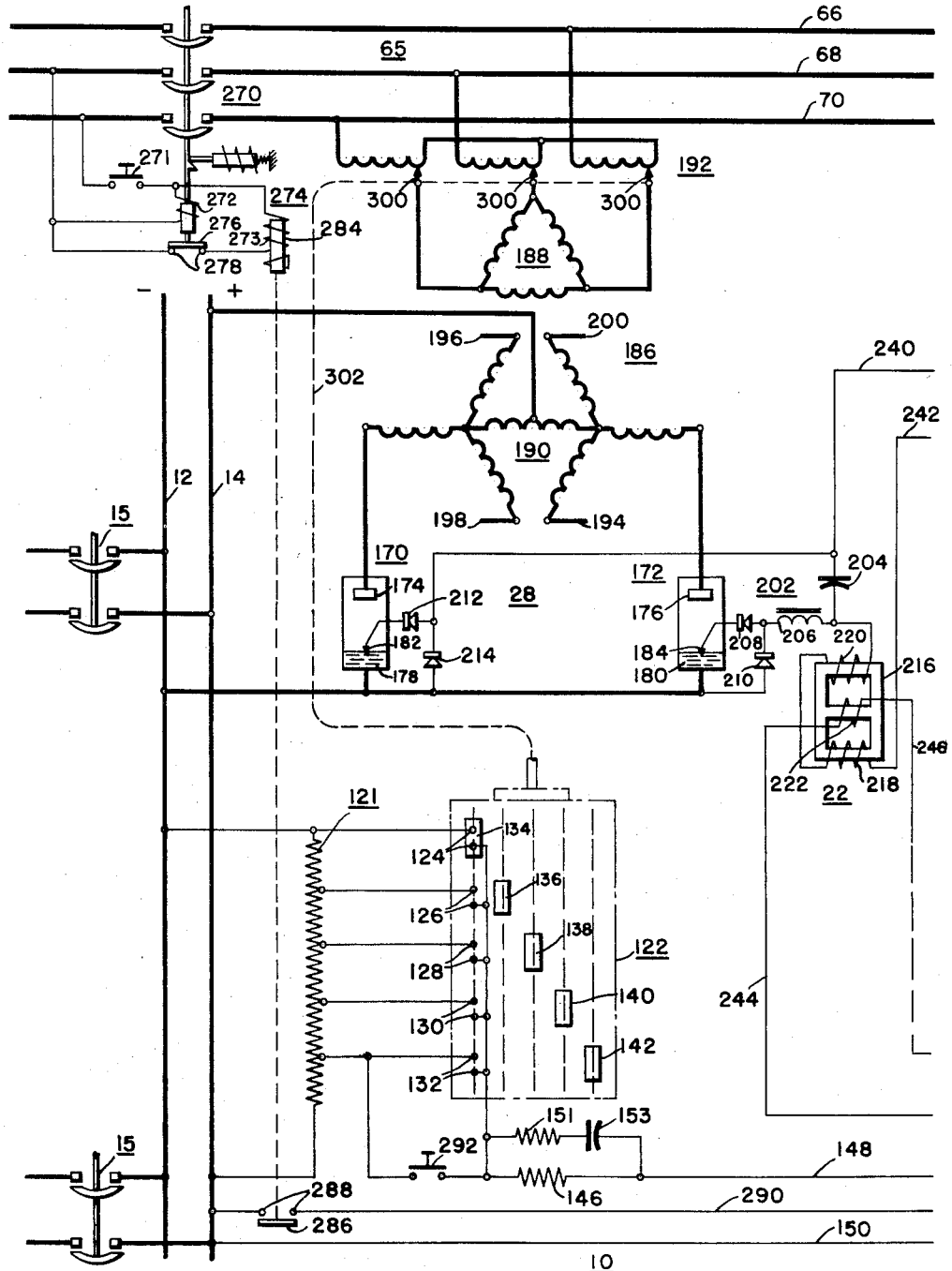
Figure 1B:
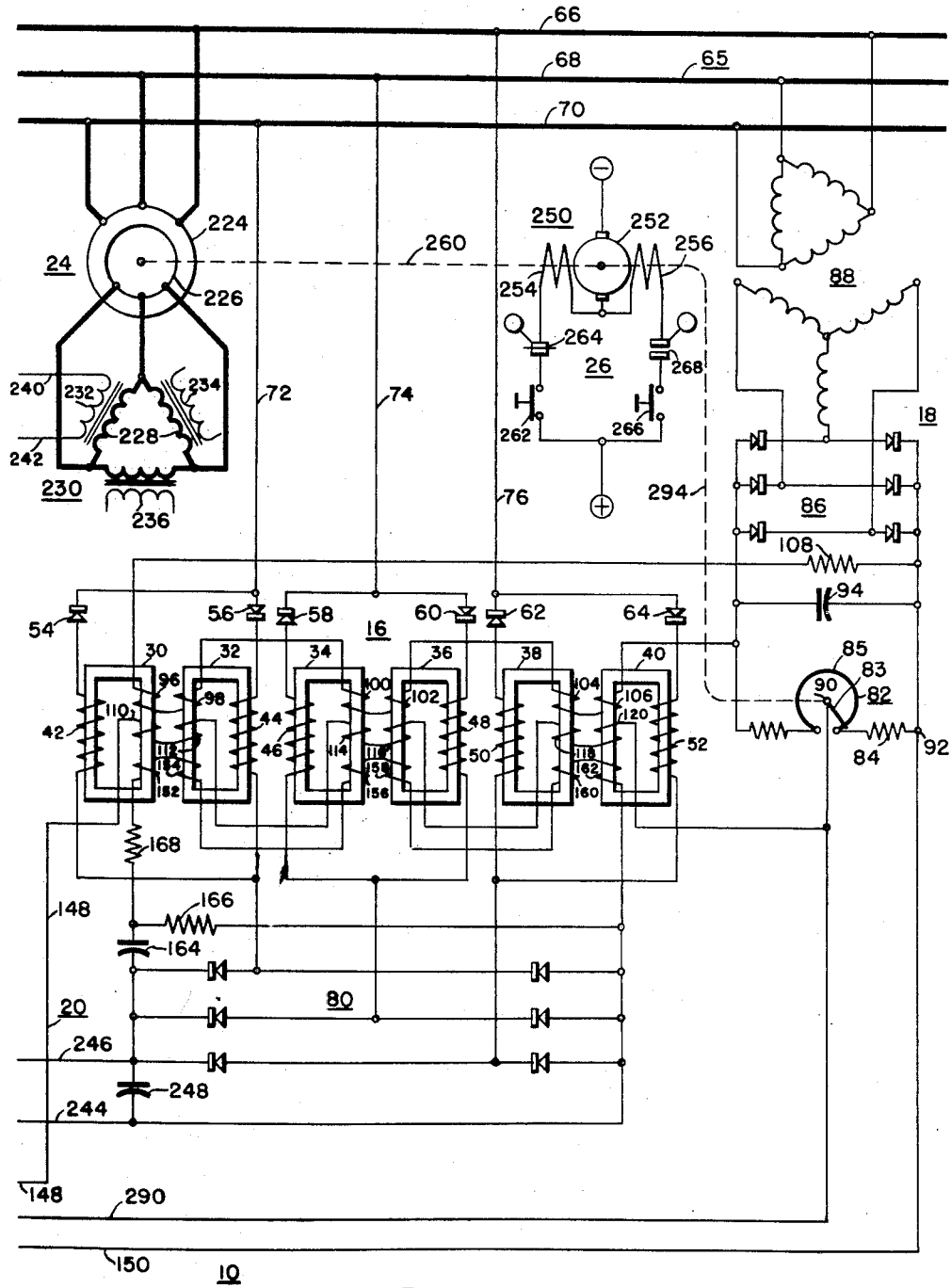

Other objects of this invention will become apparent from the following description when taken in conjunction with the accompanying drawing, in which:

Figures 1A and 1B are a composite schematic diagram of a regulator system embodying the teachings of this invention.

Referring to Figs. 1A and 1B, there is illustrated a regulator system 10 for maintaining the direct-current voltage between bus conductors 12 and 14 substantially constant, and for preventing the voltage between the bus conductors 12 and 14 from becoming excessive on either first energizing the regulator system 10 or on increasing the voltage between the bus conductors 12 and 14 to a new value to be regulated. Thus, by preventing the voltage between the bus conductors 12 and 14 from becoming excessive, load circuit interrupters 15 under such conditions are not actuated to the circuit interrupting position, to thus deenergize, for instance, roll motors (not shown).

In general, the regulator system 10 comprises a three-phase self-saturating doubler type magnetic amplifier 16, means 18 for producing a substantially constant direct-current reference voltage, circuit means 20 for rendering the magnetic amplifier 16 responsive to the difference between the reference voltage and a measure of the voltage between the bus conductors 12 and 14, a phase-shifter circuit 22, a master phase shifter 24, motor control means 26 for controlling the operation of the master phase shifter 24, the master phase shifter 24 and the magnetic amplifier 16 being connected to control the output from the phase-shifter circuit 22, and an ignitron rectifier circuit 28 connected to control the magnitude of the voltage between the bus conductors 12 and 14 and responsive to the output of the phase-shifter circuit 22.

In particular, the three-phase magnetic amplifier 16 comprises a plurality of magnetic core members 30, 32, 34, 36, 38 and 40. As illustrated, load windings 42, 44, 46, 48, 50 and 52 are disposed in inductive relationship with the magnetic core members 30, 32, 34, 36, 38 and 40, respectively. In order to produce self-saturation for the respective magnetic core members, self-saturating rectifiers 54, 56, 58, 60, 62, and 64 are connected in series circuit relationship with the respective load windings 42, 44, 46, 48, 50 and 52.

In this instance, the load windings 42, 44, 46, 48, 50 and 52 are energized from a substantially constant three-phase source 65 of alternating voltage, the source 65 including line conductors 66, 68 and 70. In particular, a conductor 72 is interconnected between the line conductor 70 and the junction point of the self-saturating rectifiers 54 and 56. In like manner, a conductor 74 is interconnected between the line conductor 68 and the junction point of the self-saturating rectifiers 58 and 60. Also, a conductor 76 is interconnected between the line conductor 66 and the junction point of the self-saturating rectifiers 62 and 64. The energizing circuits for the load windings 42, 44, 46, 48, 50 and 52 are also established by connecting the junction point of the load windings 42 and 44, the junction point of the load windings 46 and 48, and the junction point of the load windings 50 and 52, to the input of a three-phase dry-type load rectifier 80.

The means 18 for producing a substantially constant direct-current reference voltage comprises a rheostat 82 having a movable contact member 83 which is disposed to be actuated along a stationary contact member 85; an output resistor 84; a three-phase dry-type rectifier 86; and a three-phase potential transformer 88. In operation, the primary of the potential transformer 88 is energized from the source 65 of alternating voltage and the output of the transformer 88 is rectified by means of the rectifier 86.

In order that the magnitude of the direct-current reference voltage between points 90 and 92 may be varied by actuating the movable contact member 83 of the rheostat 82, the resistor 84 is interconnected between one end of the stationary contact member 85 of the rheostat 82 and one side of the output of the rectifier 86, the circuit being completed by connecting the other side of the output of the rectifier 86 to the other end of the stationary contact member 85. Thus, as the movable contact member 83 of the rheostat 82 is actuated in a counterclockwise direction, the magnitude of the reference voltage between the points 90 and 92 is continuously increased from a predetermined value until the movable contact member 83 reaches the left end of the stationary contact member 85 as illustrated. In this instance, a capacitor 94 is connected across the output of the rectifier 86 in order to filter the direct-current output of the rectifier 86 before it is applied to the input of the rheostat 82.

Again referring to the magnetic amplifier 16, in order to bias the magnetic amplifier 16 to approximately one-half output, biasing windings 96, 98, 100, 102, 104 and 106 are disposed in inductive relationship with the magnetic core members 30, 32, 34, 36, 38 and 40, respectively. The energy for the biasing windings 96, 98, 102, 104 and 106 is obtained from the output of the rectifier 86. In particular, the biasing windings 96, 98, 100, 102, 104 and 106 are connected in series circuit relationship with one another and in series circuit relationship with a current limiting resistor 108, the series circuit being connected across the output of the rectifier 86. As illustrated, the biasing windings 96, 98, 100, 102, 104 and 106 are so disposed on their respective magnetic core members 30, 32, 34, 36, 38 and 40 that current flow therethrough produces a flux in the respective magnetic core members that opposes the flux produced by the current flow through the respective load windings 42, 44, 46, 48, 50 and 52.

As hereinbefore mentioned, circuit means 20 is provided in order to render the magnetic amplifier 16 responsive to the difference between the direct-current reference voltage at the output of the means 18 and a measure of the direct-current voltage between the bus conductors 12 and 14. In particular, control windings 110, 112, 114, 116, 118 and 120 are disposed in inductive relationship with the magnetic core members 30, 32, 34, 36, 38 and 40, respectively, and are connected to be responsive to the difference between the direct-current reference voltage and a measure of the direct-current voltage between the bus conductors 12 and 14.

The circuit means 20 for obtaining a measure of the difference between the reference voltage and a measure of the voltage between the bus conductors 12 and 14 includes a potentiometer 121, and a drum controller 122 having stationary contact members 124, 126, 128, 130 and 132 and associated movable contact members 134, 136, 138, 140 and 142, respectively. Thus, with the drum controller 122 and other apparatus positioned as shown in the drawing, the circuit for rendering the series connected control windings 110, 112, 114, 116, 118 and 120 responsive to the difference between the reference voltage, as produced at the output of the means 18, and a measure of the voltage between the bus conductors 12 and 14, extends from the bus conductor 12 through the movable contact member 134 of the drum controller 122, a current-limiting resistor 146, and a conductor 148, to one end of the series connected control windings 110, 112, 114, 116, 118 and 120 of the magnetic amplifier 16. The other end of the series connected control windings 110, 112, 114, 116, 118 and 120 is connected to the point 90 of the rheostat 82. This energizing circuit is completed by connecting the right end, as illustrated, of the resistor 84 to the bus conductor 14 by means of a conductor 150.

For the purpose of forcing the magnetic amplifier and thus increasing its speed of response, a series circuit, including a resistor 151 and a capacitor 153, is connected in parallel circuit relationship with the current-limiting resistor 146.

In order to damp the magnetic amplifier 16 and thus provide system stability, negative-feedback windings 152, 154, 156, 158, 160 and 162 are disposed in inductive relationship with the magnetic core members 30, 32, 34, 36, 38 and 40, respectively. In particular, an RC network, including a capacitor 164 and a resistor 166, is connected across the output of the three-phase rectifier 80. The negative-feedback windings 152, 154, 156, 158, 160 and 162 in turn are connected in series circuit relationship with one another and in series circuit relationship with a current limiting resistor 168, the series circuit being connected across the resistor 166 of the RC network.

In general, the ignitron rectifier circuit 28 comprises a plurality of ignitron rectifiers 170 and 172 which are connected to the bus conductors 12 and 14 in order to effect a direct-current voltage between the bus conductors 12 and 14. As illustrated, the ignitron rectifiers 170 and 172 comprise anodes 174 and 176, respectively, mercury pool cathodes 178 and 180, respectively, and ignitors 182 and 184, respectively. In operation, the ignitron rectifiers 170 and 172 receive their anode voltage from the source 65 of alternating voltage. In particular, a three-phase transformer 186 having a primary winding 188 and a secondary winding 190 is interconnected between the ignitron rectifiers 170 and 172 and a tap-changing auto-transformer 192 which is energized by the source 65 of alternating voltage.

For the purpose of simplifying the drawing and the description of the control apparatus, only one phase of the rectifier comprising the ignitron rectifiers 170 and 172 is illustrated, it being understood that a pair of alternately conducting ignitron rectifiers (not shown) is interconnected with the phase terminals 194 and 196 and that a pair of alternately conducting ignitron rectifiers (not shown) is interconnected with the phase terminals 198 and 200 of the transformer 186. These interconnections (not shown) for producing a three-phase rectifier (not shown) will be described more fully hereinafter.

In order to control the firing of the ignitron rectifiers 170 and 172, a firing circuit 202 is provided. The firing circuit 202 includes a capacitor 204, saturating reactor 206, and rectifiers 208, 210, 212 and 214. In operation, the firing circuit 202 alternately supplies a peaked ignitor pulse to the ignitron rectifiers 170 and 172. In particular, the saturating reactor 206 and the capacitor 204 form a ferro-resonant circuit which establishes the ignitor pulses and the rectifiers 208, 210, 212 and 214 are so interconnected with the ignitor 184 and the cathode 180 of the ignitron rectifier 172 and with the ignitor 182 and the cathode 178 of the ignitron rectifier 170, that an ignitor pulse is alternately supplied to the ignitron rectifiers 170 and 172.

In practice, the phase-shifter circuit 22, which in this instance is a saturable reactor, controls the phase relationship between the ignitor pulses, supplied to the ignitron rectifiers 170 and 172, and their respective anode voltages. In this instance, the saturable reactor 22 comprises a three-legged magnetic core member 216 having disposed in inductive relationship therewith load windings 218 and 220, and a control winding 222.

Referring again to the master phase shifter 24, the master phase shifter comprises a stator 224 which is energized from the source 65 of alternating voltage, and a rotor 226 which is connected to supply energy to the primary winding 228 of a potential transformer 230 having secondary winding sections 232, 234 and 236. In operation, the ferro-resonant circuit, comprising the capacitor 204 and the saturating reactor 206, receives energy from the secondary winding section 232 of the transformer 230. As illustrated, the load windings 218 and 220 of the saturable reactor 22, and the capacitor 204 are connected in series circuit relationship with one another, the series circuit being connected across the secondary winding section 232 of the transformer 230 by means of conductors 240 and 242.

The regulator system 10, as hereinbefore mentioned, also comprises two other pairs of ignitron rectifiers (not shown) corresponding to the pair of ignitron rectifiers 170 and 172. A phase-shifter circuit (not shown) corresponding to the phase-shifter circuit 22 is interconnected between one of these pairs of ignitron rectifiers (not shown) and the secondary winding section 234 of the transformer 230. A phase-shifter circuit (not shown) corresponding to the phase-shifter circuit 22 is also interconnected between the other pair of ignitron rectifiers (not shown) and the secondary winding section 236 of the transformer 230 so as to produce a six-phase ignitron rectifier for the regulator system 10, the two phase-shifter circuits (not shown) also being controlled by the magnetic amplifier 16.

As hereinbefore mentioned, the output of the magnetic amplifier 16 is connected to control the operation of the phase-shifter circuit or saturable reactor 22. In particular, the control winding 222 of the saturable reactor 22 is connected across the output of the three-phase rectifier 80 by means of conductors 244 and 246, the output of the rectifier 80 being filtered by a filter capacitor 248. Thus, in operation when the magnitude of the output of the rectifier 80 changes, as will be explained more fully hereinafter, the magnitude of the current flow through the control winding 222 of the saturable reactor 22 changes to thereby change the impedance of the load windings 218 and 220, and thus effects a change in the phase relationship between the ignitor pulses, supplied to the ignitron rectifiers 170 and 172, and their respective anode voltages.

The phase relationship between the ignitor pulses, supplied to the ignitron rectifiers 170 and 172, and their respective anode voltages, can also be varied by actuating the rotor 226 of the master phase shifter 24. In practice, the master phase shifter 24 has two positions of operation, one effecting substantially no delay and the other approximately 90° delay.

The motor control means 26 is provided to order to control the positioning of the master phase shifter 24. In this instance, the motor control means 26 comprises a direct-current motor 250 having an armature 252 and forward and reverse field windings 254 and 256, respectively. As illustrated, the armature 252 of the motor 250 is mechanically connected, by means of a mechanical interlock 260, with the stator 226 of the master phase shifter 224.

In order to energize the forward field winding 254 of the motor 250, and thus actuate the rotor 226 of the master phase shifter 24 in such a direction as to decrease the delay of the voltage applied to the transformer 230, a push-button 262 is provided. Once there is substantially no delay in the voltage supplied to the transformer 230 by the phase shifter 24, a limit switch 264 is actuated to thereby deenergize the forward field winding 254 of the motor 250.

On the other hand, in order to energize the reverse field winding 256 of the motor 250, and thus actuate the rotor 226 of the master phase shifter 24 in such a direction as to increase the delay in the voltage supplied to the transformer 230, a push-button 266 is provided. Once the stator 226 of the master phase shifter 24 reaches its extreme position when rotating in the latter direction, a limit switch 268 is actuated to thereby deenergize the reverse field winding 256 of the motor 250.

In order to control the energization of the apparatus illustrated in Figs. 1A and 1B, a circuit interrupter 270 is provided. As illustrated, the circuit interrupter 270 comprises an operating coil 272, a push-button 271 for controlling the energization of the operating coil 272, and the energization of an operating coil 273 of a time delay relay 274, and a movable contact member 276 and associated stationary contact members 278 which cooperate to control the operation of time delay relay 274.

When the push-button 272 is actuated so as to energize the operating coil 272 and thus actuate the circuit interrupter 270 to the circuit closed position, the apparatus illustrated in Figs. 1A and 1B is energized and a transient voltage appears between the bus conductors 12 and 14. In accordance with the teachings of this invention, in order not to aggravate or increase this transient voltage to such an extent as to effect an opening of the load circuit interrupters 15, the time delay relay 274 is disposed to render the control windings 110, 112, 114, 116, 118 and 120 of the magnetic amplifier 16 only responsive to a measure of the voltage between the bus conductors 12 and 14. That is, the time delay relay 274, when first starting up the apparatus illustrated in Figs. 1A and 1B, effects a by-passing of the reference voltage produced at the output of the means 18.

As illustrated, the time delay relay 274 comprises the operating coil 273, an armature 284, and a movable contact member 286 and its associated stationary contacts 288. Thus, in operation when the push-button 271 is actuated to the closed position, the circuit interrupter 270 and the movable contact member 286 of the time delay relay 274 are actuated to the closed position. With the movable contact member 286 of the time delay relay 274 in the closed position with respect to its associated stationary contacts 288, a circuit is established from the bus conductor 14 through the movable contact member 286 of the time delay relay 274, a conductor 290, the control windings 120, 118, 116, 114, 112 and 110 of the magnetic amplifier 16, the conductor 148, the current limiting resistor 146, a push-button 292, when in the closed position, and a portion of the potentiometer 121, to the bus conductor 12. It is to be noted that with the movable contact member 286 of the time delay relay 274 in the closed position with respect to its associated stationary contacts 288 the current flow through the control windings 120, 118, 116, 114, 112 and 110 of the magnetic amplifier 16 is in such a direction as to decrease the magnitude of the output voltage of the magnetic amplifier 16. Such an action decreases the magnitude of the current flow through the control winding 222 of the phase-shifter circuit 22. This in turn decreases the magnitude of the output of the ignitron rectifier circuit 28 to the bus conductors 12 and 14 and therefore prevents the regulator system 10 from increasing or aggravating the transient voltage that appears between the bus conductors 12 and 14 when first energizing the apparatus illustrated in Figs. 1A and 1B.

Once the initial transient voltage between the bus conductors 12 and 14 disappears, the time delay relay 274 effects an actuation of its movable contact member 286 to the circuit interrupted position, as illustrated. Such an action reestablishes the circuit which renders the magnetic amplifier 16 responsive to the difference between the reference voltage and a measure of the voltage between the bus conductors 12 and 14.

In operation, with the push-button 292 in the closed position, a direct-current jogging voltage appears between the bus conductors 12 and 14, and when this jogging voltage is at its regulated value, the magnitude of the reference voltage as produced at the output of the means 18 is equal to the hereinbefore mentioned measure of the voltage between the bus conductors 12 and 14. Of course, owing to a drop of voltage across a portion of the potentiometer 121, the value of the regulated jogging voltage between the bus conductors 12 and 14 is somewhat higher than the magnitude of the reference voltage or the magnitude of the measure of the voltage between the bus conductors 12 and 14.

Also, in accordance with the teachings of this invention, the master phase shifter 24 is mechanically interlocked with the rheostat 82 of the means 18, so that as the position of the master phase shifter 24 is changed, a predetermined change is made in the position of the movable contact member 83 of the rheostat 82 and thus in the magnitude of the reference voltage, to thereby prevent an excessive increase in the magnitude of the direct-current voltage between the bus conductors 12 and 14. In particular, a mechanical interlock 294 is connected between the rotor 252 of the motor 250 and the movable contact member 83 of the rheostat 82. Thus, the mechanical interlocks 260 and 294 function to mechanically interlock the movable contact member 83 of the rheostat 82 with the rotor 226 of the master phase shifter 24.

By providing the mechanical interlock between the rotor 226 of the master phase shifter 24 and the movable contact member 83 of the rheostat 82, the regulator system 10 continuously regulates for the value of the voltage appearing between the bus conductors 12 and 14 as the master phase shifter 24 is actuated in the direction to decrease the delay in the voltage supplied to the transformer 230 and thus increase the magnitude of the voltage appearing between the bus conductors 12 and 14 from the jogging voltage to a predetermined operating voltage.

Referring to the autotransformer 192, the autotransformer 192 comprises movable contact members 300 which when actuated to the left, as illustrated, effect an increase in the magnitude of the voltage appearing between the bus conductors 12 and 14. In other words, by actuating the movable contact members 300 to the left, the magnitude of the anode voltage for the ignitron rectifiers 170 and 172 is increased, which in turn effects an increase in the magnitude of the voltage appearing between the bus conductors 12 and 14.

In order to obtain uniformity of response for the regulator system 10, a constant gain regulator is provided by mechanically interlocking the movable contact members 300 of the auto-transformer 192 with the drum controller 122 by means of a mechanical interlock 302. Thus, when the movable contact members 300 are actuated towards the left, as illustrated, to their next position, the drum controller 122 is actuated so that its movable contact member 136 engages its associated stationary contacts 126. If the movable contact members 300 are actuated to the extreme left position, the drum controller 122 is actuated so that its movable contact member 142 engages the associated stationary contacts 132.

By so mechanically interlocking the movable contact members 300 of the auto-transformer 192 with the drum controller 122, the magnitude of the current flow through the control windings 110, 112, 114, 116, 118 and 120 of the magnetic amplifier 16 remains substantially constant irrespective of the position of the movable contact members 300. In other words, as the magnitude of the regulated voltage between the bus conductors 12 and 14 is changed by means of the auto-transformer 192, a greater or lesser voltage drop is produced across the potentiometer 121 to thereby maintain the current flow through the control windings 110, 112, 114, 116, 118 and 120 of the magnetic amplifier 16 substantially constant.

The operation of the regulator system 10 will now be described. First, the regulator system 10 is energized by actuating the push-button 271 to the closed position to thereby energize the operating coil 272 and thus effect an actuation of the circuit interrupter 270 to the closed position. When the push-button 271 is actuated to the closed position, the operating coil 273 of the time delay relay 274 is also energized to thereby effect an actuation of the movable contact member 286 of the time delay relay 274 into engagement with the associated stationary contacts 288. This effects a by-pass of the reference voltage, as hereinbefore explained, to thereby effect a minimum of output from the magnetic amplifier 16. As hereinbefore mentioned, this prevents the regulator system 10 from producing an excessively high transient voltage between the bus conductors 12 and 14 which if permitted would effect an actuation of the load circuit interrupters 15 to the open position.

Once the transient voltage no longer appears between the bus conductors 12 and 14, the time delay relay 274 effects an actuation of the movable contact member 286 to the open position with respect to the stationary contact members 288, to thereby render the control windings 110, 112, 114, 116, 118 and 120 of the magnetic amplifier 16 responsive to the difference between the reference voltage as produced by the means 18 and a measure of the voltage between the bus conductors 12 and 14. Then by actuating the push-button 292 to the closed position the drum controller 122 is shunted out of the circuit and the regulator system 10 regulates for the minimum voltage between the bus conductors 12 and 14. When applying the regulator system 10 to steel mill apparatus this minimum voltage is known as the jogging voltage.

The manner in which the regulator system 10 maintains the jogging voltage between the bus conductors 12 and 14 substantially constant will now be described. Assuming the magnitude of the voltage between the bus conductors 12 and 14 increases to a value above the regulated value, then current will flow from the movable contact member 83 of the rheostat 82 through the control windings 120, 118, 116, 114, 112 and 110 of the magnetic amplifier 16, the conductor 148, the current limiting resistor 146, the push-button 292, and a portion of the potentiometer 121 to the bus conductor 12. A current flow in such a direction through the control windings 120, 118, 116, 114, 112 and 110 effects a decrease in the output current of the magnetic amplifier 16 to thereby decrease the magnitude of the current flow through the control winding 222 of the saturable reactor 22. A decrease in the magnitude of the current flow through the control winding 222 increases the impedance of the load windings 218 and 220. An increase in the impedance of the load windings 218 and 220 increases the firing angle between the ignitor pulses supplied to the ignition rectifiers 170 and 172 and the respective anode voltages, to thereby decrease the magnitude of the voltage between the bus conductors 12 and 14 to the regulated value.

Assuming the voltage between the bus conductors 12 and 14 decreases to a value below the regulated value, then current flows from the bus conductor 12, through a portion of the potentiometer 121, the push-button 292, the current limiting resistor 146, and the control windings 110, 112, 114, 116, 118 and 120 of the magnetic amplifier 16, to the movable contact member 83 of the rheostat 82. A current flow in such a direction through the control windings 110, 112, 114, 116, 118 and 120 of the magnetic amplifier 16 effects an increase in the magnitude of the output current of the magnetic amplifier 16 to thereby increase the magnitude of the current flow through the control winding 222 of the saturable reactor 22. Such an action decreases the impedance of the load windings 218 and 220 of the saturable reactor 22. A decrease in the impedance of the load windings 218 and 220 decreases the firing angle between the ingitor pulses supplied to the ignitron rectifiers 170 and 172 and the respective anode voltages as applied to these rectifiers. With a decrease in the firing angle between the ignitor pulses and the respective anode voltages of the respective ignitron rectifiers 170 and 172, the magnitude of the voltages between the bus conductors 12 and 14 is increased to the regulated value.

When it is desired to increase the magnitude of the voltage between the bus conductors 12 and 14 to the operating voltage, the movable contact members 300 of the auto-transformer 192 are actuated to the desired position. Of course, as hereinbefore explained, the drum controller 122 is simultaneously actuated to a corresponding position so as to provide uniformity of response for the regulator system 10.

Once the auto-transformer 192 has been properly set, the push-button 262 of the motor control circuit 26 is actuated to the closed position to thereby effect an actuation of the rotor 226 of the master phase shifter 24. Such an actuation of the rotor 226 effects a decrease in the delay of the voltage supplied to the transformer 230 to thereby increase the voltage between the bus conductors 12 and 14 to the desired operating value.

As hereinbefore explained, the movable contact member 83 of the rheostat 82 is mechanically interlocked with the rotor 226 of the master phase shifter 24 and therefore the magnitude of the reference voltage increases a corresponding amount as the master phase shifter 24 effects a decrease in the delay of the voltage supplied to the transformer 230 and thus an increase in the magnitude of the voltage appearing between the bus conductors 12 and 14. Thus, as the voltage between the bus conductors 12 and 14 is increased from the jogging voltage to the desired operating voltage, the regulator system 10 continuously regulates for the particular value of voltage then appearing between the bus conductors 12 and 14. This, of course, as hereinbefore explained, prevents an excessive increase in the magnitude of the voltage appearing between the bus conductors 12 and 14 and thus does not effect an actuation of the load circuit interrupters 15 to the open position.

The apparatus embodying the teachings of this invention has several advantages. For instance, at no time during the operation of the regulator system 10 is the voltage between the bus conductors 12 and 14 permitted to become so excessive as to effect an actuation of the load circuit interrupters 15 to the open position. Thus, continuity of service is at all times maintained to the roll motors (not shown). In addition, the regulator system 10 has uniformity of response irrespective of the setting of the movable contact members 300 of the auto-transformer 192.

Since certain changes may be made in the above apparatus and circuits and different embodiments of the invention may be made without departing from the scope thereof, it is intended that all matter contained in the above description or shown in the accompanying drawing shall be interpreted as illustrative and not in a limiting sense.

I claim as my invention:

1. In a regulating system for maintaining a quantity substantially constant, the combination comprising, means for producing a reference voltage, a magnetic amplifier, circuit means for rendering the magnetic amplifier responsive to the difference between the reference voltage and a measure of said quantity to thus control the magnitude of the output of the magnetic amplifier, control means, including a controllable rectifier, responsive to the output of the magnetic amplifier and having an output for controlling the magnitude of the said quantity, additional control means for controlling the output of said control means responsive to the output of the magnetic amplifier, and means for interlocking said additional control means with said means for producing a reference voltage, so that as the said additional control means effects a change in the magnitude of the said quantity, a predetermined change is made in the magnitude of the reference voltage, to thereby prevent an excessive increase in the magnitude of the said quantity.

2. In a regulating system for maintaining a quantity substantially constant, the combination comprising, means for producing a reference voltage, a magnetic amplifier, circuit means for rendering the magnetic amplifier responsive to the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and means for interlocking the master phase shifter with said means for producing a reference voltage, so that as the position of the master phase shifter is changed a predetermined change is made in the magnitude of the reference voltage, to thereby prevent an excessive increase in the magnitude of the said quantity.

3. In a regulating system for maintaining a quantity substantially constant, the combination comprising, means for producing a reference voltage, a magnetic amplifier, circuit means for rendering the magnetic amplifier responsive to the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and mechanical means for interlocking the master phase shifter with said means for producing a reference voltage, so that as the position of the master phase shifter is changed a predetermined change is made in the magnitude of the reference voltage, to thereby prevent an excessive increase in the magnitude of the said quantity.

4. In a regulating system for maintaining a quantity substantially constant, the combination comprising, a rheostat, circuit means connected to the rheostat for producing a reference voltage which can be varied by means of the rheostat, a magnetic amplifier, other circuit means for rendering the magnetic amplifier responsive to the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and mechanical means for interlocking the master phase shifter with the rheostat, so that as the position of the master phase shifter is changed a predetermined change is made in the position of the rheostat and thus in the magnitude of the reference voltage, to thereby prevent an excessive increase in the magnitude of the said quantity.

5. In a regulating system for maintaining a quantity substantially constant, the combination comprising, means for producing a reference voltage, a magnetic amplifier, circuit means for rendering the magnetic amplifier responsive to first, a measure of said quantity, and second, the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and means for interlocking the master phase shifter with said means for producing a reference voltage, so that as the position of the master phase shifter is changed a predetermined change is made in the magnitude of the reference voltage, to thereby prevent an excessive increase in the magnitude of the said quantity.

6. In a regulating system for maintaining a quantity substantially constant, the combination comprising, means for producing a reference voltage, a magnetic amplifier, circuit means for rendering the magnetic amplifier responsive to first, a measure of said quantity, and second, the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and mechanical means for interlocking the master phase shifter with said means for producing a reference voltage, so that as the position of the master phase shifter is changed a predetermined change is made in the magnitude of the reference voltage, to thereby prevent an excessive increase in the magnitude of the said quantity.

7. In a regulating system for maintaining a quantity substantially constant, the combination comprising, a rheostat, circuit means connected to the rheostat for producing a reference voltage which can be varied by means of the rheostat, a magnetic amplifier, other circuit means for rendering the magnetic amplifier responsive to first, a measure of said quantity, and second, the difference between the reference voltage and a measure of said quantity to thus control the magnitude of the output of the magnetic amplifier, a phase-shifter circuit responsive to the output of the magnetic amplifier, a controllable rectifier responsive to the output of the phase-shifter circuit for controlling the magnitude of the said quantity, a master phase shifter for controlling the output of the phase-shifter circuit, and mechanical means for interlocking the master phase shifter with the rheostat, so that as the position of the master phase shifter is changed a predetermined change is made in the position of the rheostat and thus in the magnitude of the reference voltage, to thereby prevent an excessive increase in the magnitude of the said quantity.

8. In a regulating system for maintaining a quantity substantially constant, the combination comprising, means for producing a reference voltage, a magnetic amplifier including a control winding, circuit means for rendering the control winding of the magnetic amplifier responsive to the difference between the reference voltage and a measure of said quantity to thus control the magnitude of the output of the magnetic amplifier, a phase-shifter circuit responsive to the output of the magnetic amplifier, an ignitron rectifier circuit responsive to the output of the phase-shifter circuit for controlling the magnitude of the said quantity, variable transformer means for also controlling the ignitron rectifier circuit and thus the magnitude of the said quantity, a master phase shifter for controlling the output of the phase-shifter circuit, means for interlocking the master phase shifter with said means for producing a reference voltage, so that as the position of the master phase shifter is changed a predetermined change is made in the magnitude of the reference voltage to thereby prevent an excessive increase in the magnitude of the said quantity, and means for interlocking said variable transformer means with said circuit means, so that the current flow through the control winding of the magnetic amplifier remains substantially constant for various predetermined settings of the said variable transformer means.

References Cited in the file of this patent

UNITED STATES PATENTS

| | | |
|---|---|---|
| 2,318,091 | Myers | May 4, 1943 |
| 2,394,013 | Rose | Feb. 5, 1946 |
| 2,568,391 | Geiselman | Sept. 18, 1951 |
| 2,707,764 | Mittag | May 3, 1955 |
| 2,717,351 | Christian et al. | Sept. 6, 1955 |